Aug. 27, 1929.     J. E. PFLUEGER     1,726,502

COMBINED FISHHOOK AND WEED GUARD

Filed Jan. 6, 1925

INVENTOR.
JOSEPH E. PFLUEGER
BY
ATTORNEY.

Patented Aug. 27, 1929.

1,726,502

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

COMBINED FISHHOOK AND WEED GUARD.   REISSUED

Application filed January 6, 1925. Serial No. 793.

This invention relates to fish hooks with which are combined light, flexible, resilient weed guards which project over the hook to prevent entanglement of the hook with weeds. Light flexible weed guards such as in common use are apt to bend or be distorted so as not to function properly and it is the object of the present invention to construct a weed guard which will be guided by the hook so as always to remain in proper relation thereto, and also to provide means for limiting the outward movement of the guard so that it can not be bent outwardly from the hook.
It is also an object of the invention to combine a spinner or spoon, or other lure upon the weed guard in the rear of the hook so as not to interfere with hooking the fish.

In the drawings is shown one embodiment of the invention, it being understood that changes and modifications may be made within the scope of the invention and the claims appended hereto.

In the drawings:
Figure 1 is a side view of the improved hook and weed guard;

Figure 1:
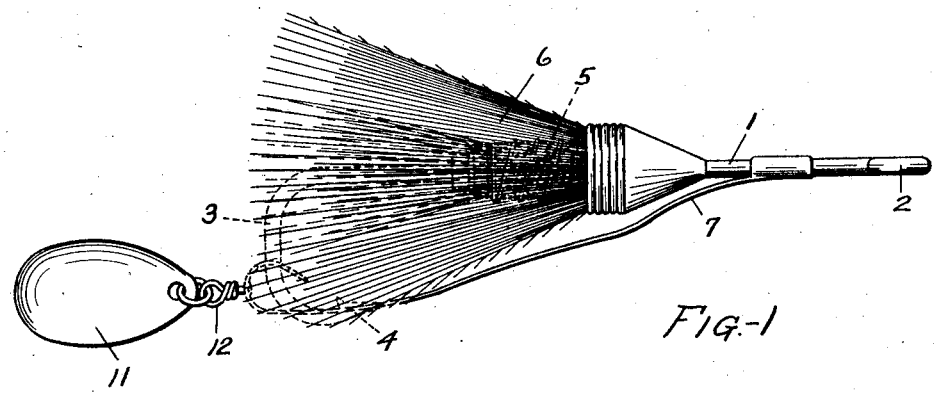
Figure 2:
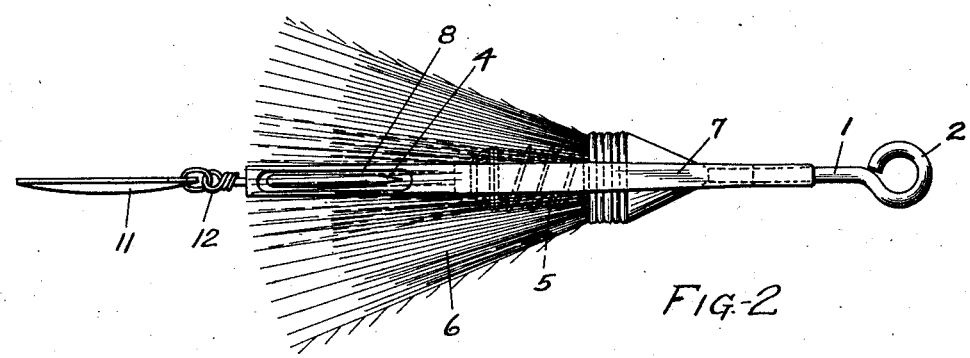
Figure 2 is a view looking down at the weed guard from above.
Figure 3:
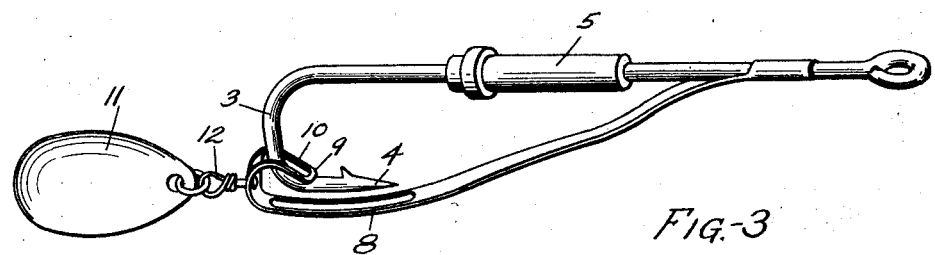
Figure 3 is a perspective view of the hook and weed guard.

The shank of the hook is indicated by the numeral 1, and the eye by the numeral 2. The curved portion of the hook is indicated by the numeral 3 and the barb or point by the numeral 4. On the shank of the hook is located the weight 5 and to the weight may be attached a lure 6, which in the present embodiment of the invention is in the form of a buck-tail, although other lures or attractions may be utilized.

The weed guard is a light, flexible, resilient strip of spring metal which is attached to the shank of the hook and overlies the point. In the form of the invention illustrated a strip of flat metal 7 is attached to the shank above the weight and is bent outwardly slightly so as to overlie the hook, the portion of the guard over the hook being slotted as at 8, so as to permit movement of the guard inwardly, the hook passing through the slot and being exposed. The end of the guard is reversely bent as at 9, and is received over the curved portion 3 of the hook, a second slot 10 being provided for that purpose.

It will be observed that when the fish strikes the hook, the weed guard will yield readily to expose the hook and will not interfere with catching the fish. The slot 8 and also the slot 10 guide the weed guard and prevent its being bent out of shape. The return portion 9 of the guard will prevent its being bent outwardly away from the hook. The solid portion of the guard between the slots and in that portion of the guards, which extends beyond the hook, braces the weed guard so that it cannot be easily bent out of shape, and the slot 8 will register with the barbed portion of the hook.

If desired the weed guard may be provided with a spinner, spoon or other lure which is indicated by the numeral 11. This spoon is attached by the swivel 12 to the lower end of the weed guard below the hook and provides an additional lure for the hook. Being located beyond, or at the rear of the hook it does not offer any obstruction to the hook.

It will be observed that there has been provided a new and useful weed guard which is so constructed and designed that it cannot be bent or distorted but will always lie in its correct position with respect to the hook. The utilization of the weed guard as a carrier for the spinner or lure places that element at the rear where it can not interfere with the hook.

These and other objects and advantages will be apparent to those skilled in the art and it is the intention to cover such features as broadly as is consistent with the prior art and with a fair interpretation of the attached claims.

What is claimed is:

1. A fish hook, and a flexible weed guard for the hook, said weed guard having a hook guarding portion and a guiding portion rearwardly thereof and movable over the curved portion of the hook, and a lure attached to the guiding portion of the weed guard.

2. A fish hook, a flexible weed guard overlying the hook, means to guide the weed guard upon the hook, and a spinner carried by the weed guard in the rear of the hook.

3. A fish hook, a weed guard mounted thereon, said weed guard being formed from a light, flexible strip of metal, having a slot near its outer end adapted to pass over the hook when the guard is depressed and also provided with a return bent portion having a second slot received over the curved portion of the hook, and a fish lure attached to the guard between the slots.

4. A fish hook, a weed guard mounted thereon, said weed guard extending outwardly beyond the limit of the hook and having a return bent portion which engages the curved portion of the hook, the return bent portion being provided with a slot through which the curved portion of the hook is movable and the main body of the guard having a slot through which the barbed portion of the hook is movable, and a solid portion in that part of the guard which extends beyond the limit of the hook.

JOSEPH E. PFLUEGER.